(12) United States Patent
Bogdanov et al.

(10) Patent No.: US 10,569,910 B2
(45) Date of Patent: Feb. 25, 2020

(54) EJECTION UNIT FOR A SATELLITE

(71) Applicant: EXOLAUNCH GmbH, Berlin (DE)

(72) Inventors: Dimitriy Bogdanov, Berlin (DE); Peter Schwarz, Salzburg (AT); Johannes Gruber, St. Johann im Pongau (AT); Peter Wimmer, Pfarrwerfen (AT); Vsevolod Kryukovskiy, Moscow (RU)

(73) Assignee: EXOLAUNCH Gmbh, Berlin (DE)

( * ) Notice: Subject to any disclaimer, the term of this patent is extended or adjusted under 35 U.S.C. 154(b) by 234 days.

(21) Appl. No.: 15/590,425

(22) Filed: May 9, 2017

(65) Prior Publication Data

US 2017/0327253 A1 Nov. 16, 2017

(30) Foreign Application Priority Data

May 10, 2016 (DE) .................. 10 2016 108 606

(51) Int. Cl.
*B64G 1/64* (2006.01)
(52) U.S. Cl.
CPC ............ *B64G 1/645* (2013.01); *B64G 1/641* (2013.01); *B64G 2001/643* (2013.01)
(58) Field of Classification Search
CPC ... B64G 1/641; B64G 1/645; B64G 2001/643
USPC ..................................... 244/173.3
See application file for complete search history.

(56) References Cited

U.S. PATENT DOCUMENTS

| 1,750,933 | A | * | 3/1930 | Koons, Sr. | ............... | E05C 9/048 |
| | | | | | | 292/3 |
| 4,362,328 | A | * | 12/1982 | Tacheny | .................. | E05C 9/043 |
| | | | | | | 292/36 |
| 4,387,917 | A | * | 6/1983 | Cocker | .................. | E05B 63/20 |
| | | | | | | 292/40 |
| 5,199,672 | A | * | 4/1993 | King | ..................... | B64G 1/007 |
| | | | | | | 244/164 |
| 5,472,247 | A | * | 12/1995 | Monson | .................... | E05C 9/06 |
| | | | | | | 292/167 |
| 5,595,076 | A | * | 1/1997 | Weinerman | ............... | E05B 5/00 |
| | | | | | | 292/34 |
| 5,605,308 | A | * | 2/1997 | Quan | ..................... | B64G 1/641 |
| | | | | | | 102/489 |
| 5,613,653 | A | * | 3/1997 | Bombled | ............... | B64G 1/641 |
| | | | | | | 244/173.1 |

(Continued)

FOREIGN PATENT DOCUMENTS

CN 103010489 A 4/2013
DE 102006043660 A1 3/2008
(Continued)

OTHER PUBLICATIONS

Chuck Lazansky and Scott Christiansen, Problems and Product Improvements in a Qualified, Flight Heritage Product, Proceedings of the 38th Aerospace Mechanisms Symposium, Langley Research Center, May 17-19, 2016, pp. 75-88.

*Primary Examiner* — Claude J Brown
(74) *Attorney, Agent, or Firm* — Vivacqua Law, PLLC (57) ABSTRACT

The invention relates to an ejection unit for at least one satellite, in particular a picosatellite, comprising a frame that defines an inner space for receiving the satellite; and a retention device for holding the satellite in the inner space, the retention device being configured such that the satellite is releasable from the retention device.

11 Claims, 10 Drawing Sheets

(56) References Cited

U.S. PATENT DOCUMENTS

| | | | | |
|---|---|---|---|---|
| 6,138,951 | A * | 10/2000 | Budris | B64G 1/002 |
| | | | | 102/393 |
| 6,276,639 | B1 * | 8/2001 | Hornung | B64G 1/002 |
| | | | | 102/489 |
| 6,296,206 | B1 * | 10/2001 | Chamness | B64G 1/00 |
| | | | | 244/173.3 |
| 7,036,773 | B2 | 5/2006 | Caldwell | |
| 8,939,409 | B2 | 1/2015 | Apland et al. | |
| 9,434,486 | B1 * | 9/2016 | Santos | B64G 1/222 |
| 2010/0090066 | A1 | 4/2010 | Holemans | |
| 2011/0240802 | A1 | 10/2011 | Balinov | |
| 2014/0027578 | A1 | 1/2014 | Comtesse | |
| 2014/0131521 | A1 * | 5/2014 | Apland | B64G 1/641 |
| | | | | 244/173.3 |
| 2014/0319283 | A1 | 10/2014 | Holemans et al. | |
| 2015/0232205 | A1 * | 8/2015 | Lively | B64G 1/002 |
| | | | | 244/2 |
| 2015/0329224 | A1 * | 11/2015 | Sachdev | B64G 1/641 |
| | | | | 244/173.3 |
| 2015/0344157 | A1 | 12/2015 | Horie | |
| 2016/0031572 | A1 | 2/2016 | Dube | |

FOREIGN PATENT DOCUMENTS

| | | | | |
|---|---|---|---|---|
| DE | 202009000949 U1 | 5/2009 | | |
| DE | 202014008902 U1 | 2/2015 | | |
| FR | 2876984 A1 | 4/2006 | | |
| GB | 2130293 A * | 5/1984 | | E05B 63/20 |
| JP | 2011136620 A | 7/2011 | | |
| WO | 2004113170 A1 | 12/2004 | | |

* cited by examiner

EJECTION UNIT FOR A SATELLITE

The present invention relates to an ejection unit for at least one satellite, in particular a picosatellite, having a frame that defines an inner space for receiving the satellite.

Picosatellites according to the CubeSat standard are, for example, typically transported into an orbit by a rocket and are ejected from the rocket there by an ejection unit. In this respect, the satellite and the ejection unit are exposed to high loads, in particular on the launch of the rocket and on the separation of rocket parts such as a larger main satellite.

It is an object of the invention to securely fix a satellite in an ejection unit of the initially named kind during the transport to an ejection site.

The object is satisfied by an ejection unit in accordance with claim 1 and in particular in that the ejection unit comprises a retention device for holding the satellite in the inner space that is configured such that the satellite can be released from the retention device. The satellite can hereby be securely fixed in the ejection unit and can be reliably released and ejected at the ejection site.

In an embodiment, the retention device comprises a cover for closing the inner space, wherein the cover is releasably blocked with respect to the frame by at least one displaceable bolt in a closed position.

The use of the bolt represents a particularly simple, but reliable possibility to block the cover with respect to the frame and thus to fix the satellite during the transport. In addition, the cover and thus the satellite can hereby be reliably released. A bolt can furthermore be displaced particularly precisely and at an exactly defined time to release the cover. It is therefore ensured by the bolt that the satellite can be ejected exactly at a planned ejection site.

The bolt grips into a blocking recess provide for the bolt in the closed position of the cover, for example, and can be pulled out of the blocking recess to release the cover. The blocking recess can in particular be part of the frame or can be fastened thereto.

In a further embodiment, the bolt is formed as a part of the cover. This allows a particularly compact construction of the ejection unit, in particular of the frame, wherein a displacement mechanism for the bolt can in particular be completely accommodated in the cover.

The cover can, for example, be supported under a preload in the closed position such that the cover is moved into an open position when it is released. No separate actuation system is thereby required to open the cover, which ensures a secure opening of the cover and likewise makes possible a compact construction of the ejection unit. The cover can, for example, be pivoted open about a pivot axis and can be preloaded about the pivot axis by a torsion spring. Alternatively or additionally, the cover can be resiliently supported with respect to the satellite such that the cover pushes off into the open position after the release from the satellite.

The ejection unit can in particular have a release mechanism by which the bolt can be moved out of a blocking position into a release position. The release mechanism can in particular be provided with a redundancy. The release mechanism is, for example, formed as part of the cover, which allows a compact construction.

In a further development, the release mechanism comprises a slider that is coupled to the bolt, that is held preloaded in a blocking position and that is releasable from this position to displace the bolt into a release position. The bolt is, for example, connected in an articulated manner to the slider by a linkage, wherein the slider and the linkage can form an elbow joint for the bolt.

In a further embodiment, two bolts are provided. The cover can hereby be redundantly securely fixed, namely at two points. The bolts are in this respect in particular aligned such that they are displaceable in an opposed manner into a respective release position. The bolts are in particular arranged coaxially.

For example, a or each bolt is preloaded in the direction of a release position by a spring. In this respect, the bolts can be set force free in a blocking position by a linkage. It is hereby achieved that no forces act on further movable components, in particular of a release mechanism, in the blocking position. The bolts are thus held particularly reliably in the blocking position and an unwanted release of the cover is effectively avoided. The bolts can in particular be aligned such that returning forces of the spring are substantially balanced. Alternatively or additionally, the bolts can be set force free by the linkage in the blocking position such that a minimum deflection of the linkage and/or of the bolts has the result that the bolts are no longer set force free such that at least one of the springs displaces the bolt or bolts into the release position. Such an embodiment proves advantageous because a secure and force free support of the bolts is hereby ensured, on the one hand, and the springs can reliably effect the release of the cover at the desired point in time, on the other hand.

In a further embodiment, each bolt can be connected to a slider of the release mechanism via a separate linkage. In this respect, the linkages with the slider form a double elbow joint that couples the bolts to the slider such that a movement of a bolt into the release position results in a movement of the second bolt into the release position. It is ensured by such a coupling, in particular in a redundant manner, that both bolts are displaced into their release positions at a desired release time. At least one spring for a bolt can in particular have such large dimensions that it also effects a displacement of both bolts into the release position on a failure of a further spring, wherein for this purpose a minimum deflection of the linkage and/or of the bolts may optionally be necessary. Two of these springs that have such large dimensions are advantageously provided such that the bolts can be displaced redundantly, that is with a particularly high safeguarding against failure, into their respective release positions.

The release mechanism can comprise at least one rocker lever by which the at least one bolt is held indirectly or directly in a blocking position. The rocker lever can in this respect in particular tilt out of a blocking position to release the bolt. The bolt can, for example, be held via a slider interposed between the rocker lever and the bolt. The rocker lever in particular has a first lever arm and a second lever arm, wherein the bolt in the blocking position is supported directly or indirectly at the first lever arm and an electrically controllable holding device is active at the second lever arm that releases the second lever arm by an electrical control such that a preloaded element such as the bolt and/or a spring connected to the first lever end moves the rocker lever into a release position.

A further embodiment is characterized in that two rocker levers are provided and a preloaded element of the release mechanism comprises a pivot arm that is in engagement with both rocker levers in the blocking position to support the preloaded element, wherein the pivot arm is pivotable such that the preloaded element, and thus the bolt, are releasable from the blocking position by tilting only one rocker lever into a release position. This embodiment provides a redundant and thus particularly reliable release of the cover. The preloaded element can in particular comprise the bolt or bolts and/or a slider.

It is also advantageous if the at least one rocker lever has a pivot bearing and is loaded by a preloaded element of the release mechanism that has a slope by which a force exerted onto the rocker lever by the preloaded element extends in the direction of the pivot bearing, in particular through an axis of rotation of the pivot bearing. The force exerted on the rocker lever by the preloaded element in a blocking position is hereby taken up, in particular substantially completely, by the pivot bearing such that substantially no torque results on the lever from this force, at least in the blocking position. This has the result that the preloaded element also does not substantially effect any torque on the rocker lever about its axis of rotation on high mechanical loads on the ejection unit, e.g. during a rocket launch, and the rocker lever can thus be held particularly securely in its blocking position during these loads.

The ejection unit in accordance with the invention can also be further improved in that the bolt has a slope for a running onto a frame-side counter-bearing for the bolt in the blocking position. This prevents the bolt from sticking at the counter-bearing even though the bolt and/or a release mechanism for the release has been actuated. Such a sticking can be caused without the slope, for example, by galling and/or by shape changes of the bolt and/or counter-bearing during high mechanical loads, e.g. during a rocket launch. The slope therefore has the effect that the bolt can be displaced into the release position with a particularly high reliability. The slope is in particular slanted with respect to a main axis of the bolt. The slope can e.g. be substantially planar or can also have a different, e.g. swept, shape.

The safety advantage of the slope is further amplified when the counter-bearing is a ball bearing. In this case, the slope can also roll off gently at the ball bearing under high loads so that shape changes and galling are avoided even more effectively. A ball bearing can, however, also be provided in a differently shaped, for example cylindrical, bolt.

In a further embodiment, the bolt and the counter-bearing are preloaded against one another in an ejection direction in a blocking position. The counter-bearing thereby exerts a force in the direction of its release position via the slope onto the bolt in the blocking position. The release of the cover is thus ensured even more reliably. The preload in particular has such a large dimension that the force on the bolt is large enough to move the bolt, and in particular also a second bolt, into the release position on its own, that is e.g. on a failure of a spring associated with the bolt. This embodiment also serves, in particular in conjunction with further redundant measures, to ensure a release of the cover at the desired time in every case.

In accordance with an advantageous further development, two bolts and two rocker levers of the release mechanism are arranged symmetrically with respect to a slider of the release mechanism. It can hereby be ensured that the bolts are simultaneously move into the release position at the desired time.

Alternatively or additionally, a magnetic holder is provided by which the release mechanism is held magnetically in a secured position. In this respect, a magnetic field of the magnetic holder can in particular be variable to move the release mechanism into a release position. The release mechanism can hereby be held in the blocking position without any energy input and only a relatively small energy input is required to move the release mechanism into the release position. The magnetic holder can in particular engage at a lever arm of a rocker lever.

In a further embodiment of the invention, the ejection unit defines an ejection direction and the retention device comprises a fixing apparatus that engages at the satellite transversely to the ejection direction for fixing the satellite, wherein the fixing apparatus has at least one movable fixing element that is movable, in particular substantially exclusively, in a translatory manner between a fixing position and a release position.

The satellite can in particular be effectively fixed by the fixing apparatus in at least one direction transversely to the ejection direction. The translatory movement of the fixing element effects a particularly defined movement of the fixing element between the fixing position and the release position. The satellite can thus be released precisely at a desire time by the fixing apparatus. A fixing of the satellite in the ejection direction can, for example, be effected by a cover of the ejection unit or by a preloaded element arranged at the cover. Alternatively or additionally, the fixing by the fixing element can also effect a fixing in the ejection direction, e.g. by shape matching and/or friction locking. The fixing element can in particular be movable transversely to the ejection direction and/or can be displaceable toward an outer wall of the satellite for the fixing thereof. The fixing apparatus is, for example, of elongate design and/or extends substantially in parallel with the ejection direction, which allows a compact construction of the ejection unit.

In a further development, at least a pair of fixing elements is provided that are effective in a plane that extends transversely to the ejection direction. The satellite can hereby be even more effectively fixed. The fixing elements of the at least one pair in particular act substantially perpendicular to one another and/or at a corner of the satellite.

For an even more secure fixing, alternatively or additionally, a plurality of fixing elements or pairs of fixing elements can be provided that are arranged distributed along the ejection direction. The satellite is hereby effectively protected against a tilting and is in particular fixed over substantially its total length.

A spring element that tensions the or each fixing element in the fixing position with respect to the satellite can in particular be provided for compensating production tolerances.

In a further embodiment, the fixing apparatus can have a guide for the fixing element by which the fixing element is movable between the fixing position and the release position. A particularly compact construction of the fixing element and thus of the ejection device is hereby made possible. The slot guide is in particular configured to effect a translatory movement of an element of the fixing apparatus in parallel with the ejection direction into a translatory movement of the fixing element transversely to the ejection direction, in particular wherein the element in one part displaces a plurality of separate fixing elements over respective slot guides.

The fixing element can, for example, be displaceably supported in a rail for the satellite and/or for a satellite platform. A rail for the satellite and/or for a satellite platform is typically anyway provided in an ejection unit to be able to eject the satellite in a defined direction without rotation. A guide for the fixing element can thus advantageously be integrated into the rail, in particular into one of four rails of a satellite chamber, such that in turn a particularly compact construction is made possible.

Provision can furthermore be made that the fixing apparatus is coupled to a cover of the ejection unit such that an opening of the cover effects a moving of the or each fixing element into the release position. It can thus be ensured without an additional actuator system that the release of the satellite takes place at a specific opening angle of the cover. This specific opening angle amounts, for example, to approximately 90°.

The fixing apparatus in a further development comprises at least two elements that are displaceable relative to one another along the ejection direction for fixing and/or releasing the satellite. This further development also makes possible a particularly compact construction. The displacement can, for example, be carried out in parallel with the ejection direction. One of the elements is in particular the fixing element. Alternatively or additionally, one of the elements can, for example, have a guide projection and/or a guide bolt, in particular for engagement with a guide of another one of the elements.

Alternatively or additionally, one of the elements can be configured as a hollow section and a control bar can be provided for controlling the displacement of the element relative to the other element, the control bar extending through the hollow section.

In accordance with a further embodiment of the invention, an ejection spring blockable by a lever and a latch for locking the lever in a blocking position are provided. In this respect, the latch is coupled to a cover of the ejection unit with a floating support. This embodiment has the advantage that a closing of the cover, for example by accident, does not result in damage to the lever when the lever is not located in a locking position, but rather in another undefined position that would have the consequence of a collision of the latch with the lever on the closing of the cover.

The latch can in particular be coupled to the cover via a spring, which represents a particularly simple variant of the floating support. The latch can thus simply compress on a collision with the lever without the lever or other parts of the ejection unit being damaged.

A further independent subject of the invention that can, however, be combined with the above-described subjects is an ejection unit for at least one satellite, in particular a picosatellite, having a frame that defines an inner space for receiving the satellite and an opening to the inner space, a covering for the opening releasably fastened to the frame by means of a fastening element and a security against loss for the fastening element.

It can, for example, be necessary briefly before the launch of a rocket transporting the satellite to release the covering from the frame, for example to switch on electronics of the satellite through the opening. It is prevented by the security against loss that in this respect the fastening element is lost and in particular falls into an inaccessible region of the rocket, which would have the consequence that the fastening element would have to be looked for and removed before the launch.

The security against loss can, for example, be configured as a lug that can be restored and that is in particular fastened to the covering. The security against loss can preload the fastening element toward the covering. The fastening element can be configured as a screw. The screw can in particular comprise a screw head which has a projection, in particular a peripheral projection, that projects radially with respect to a screw axis and via which the security against loss preloads the fastening element.

Further embodiments of the invention can be seen from the claims, from the description and from the drawings.

The invention will be explained only by way of example in the following with reference to schematic drawings.

Figure 1:
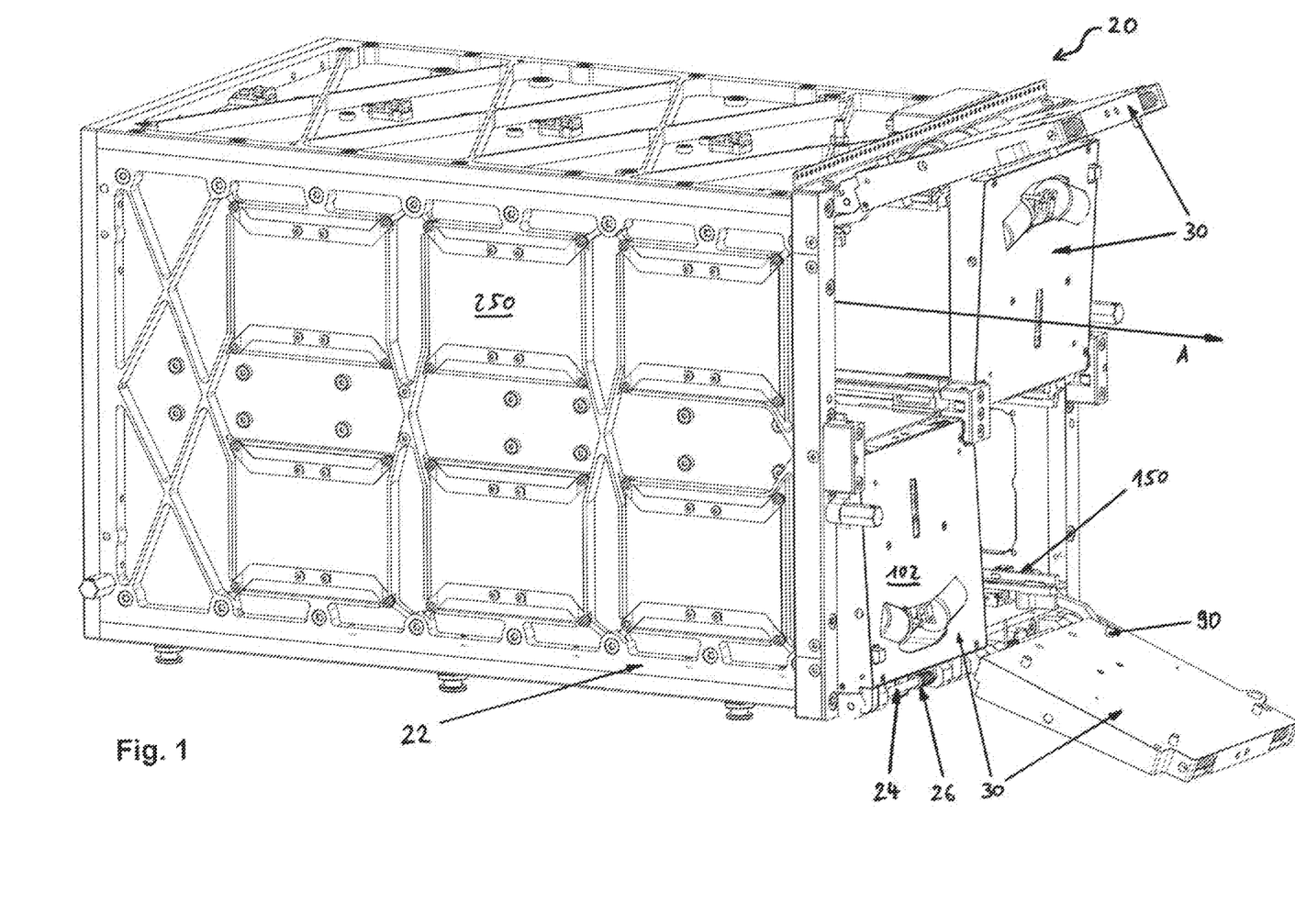
FIG. 1 shows an ejection unit in accordance with the invention in a perspective view.

The ejection unit 20 shown in FIG. 1 comprises a frame 22 that defines an inner space for receiving a plurality of satellites, not shown. The inner space comprises four satellite chambers that can each be closed by a cover 30. Each cover 30 secures a satellite with respect to a movement in an ejection direction A in a closed position. In addition, a fixing apparatus 150 is arranged in each satellite chamber and secures the satellite transversely to the ejection direction A.

The frame 22 comprises a plurality of openings for each satellite chamber that are each closed by a covering 250. An engineer can reach the respective satellite through the openings without having to remove it from the ejection unit 20.

Each cover is rotatably supported about a cover axis 24 at one side and is preloaded into an open position by a cover spring 26 that is configured as a torsion spring. The cover 30 comprises a plurality of dampening pins 90 that contact the respective satellite in the closed position and secure it in the ejection direction A.

Each cover 30 is blocked in its closed position during the transport of the satellites to a desired ejection site and is released at the ejection site, whereupon the cover is moved into its open position as a consequence of the preload by the cover spring 26 such that the respective satellite can be ejected.

Figure 2:
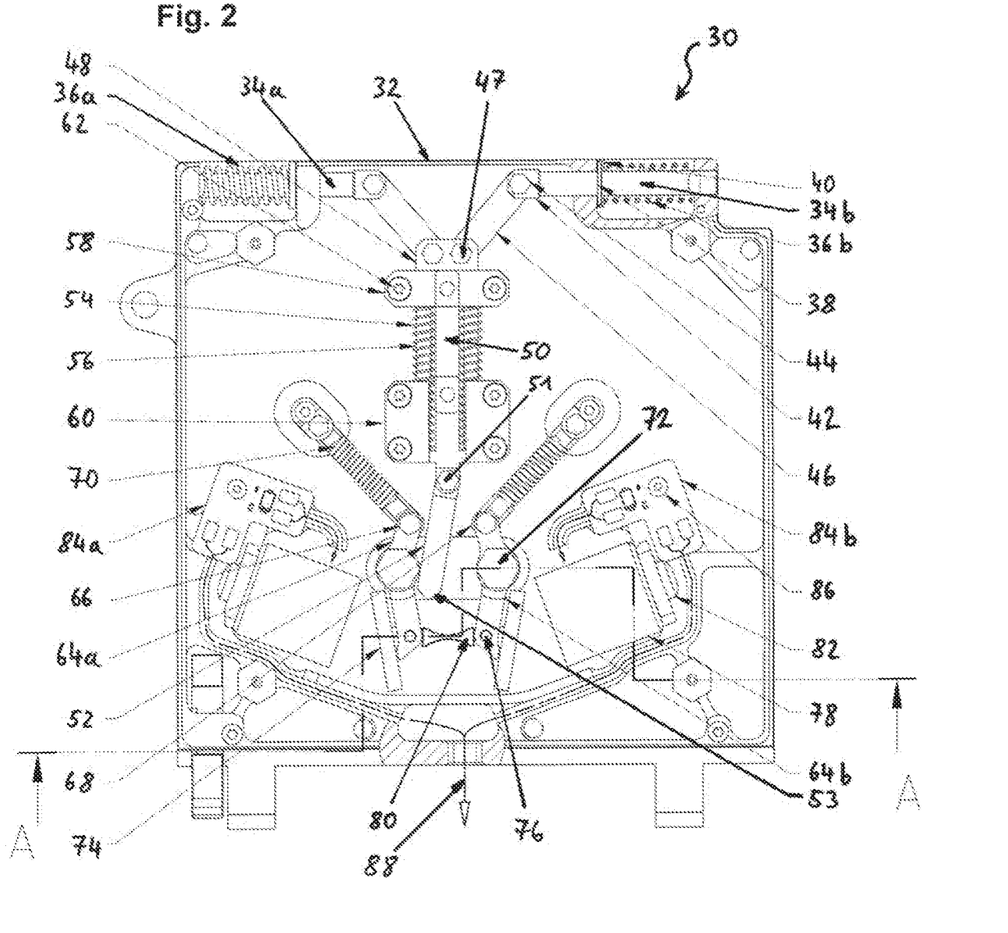
FIG. 2 shows a cover of the ejection unit with a release mechanism in a release position in a plan view.
Figure 4:
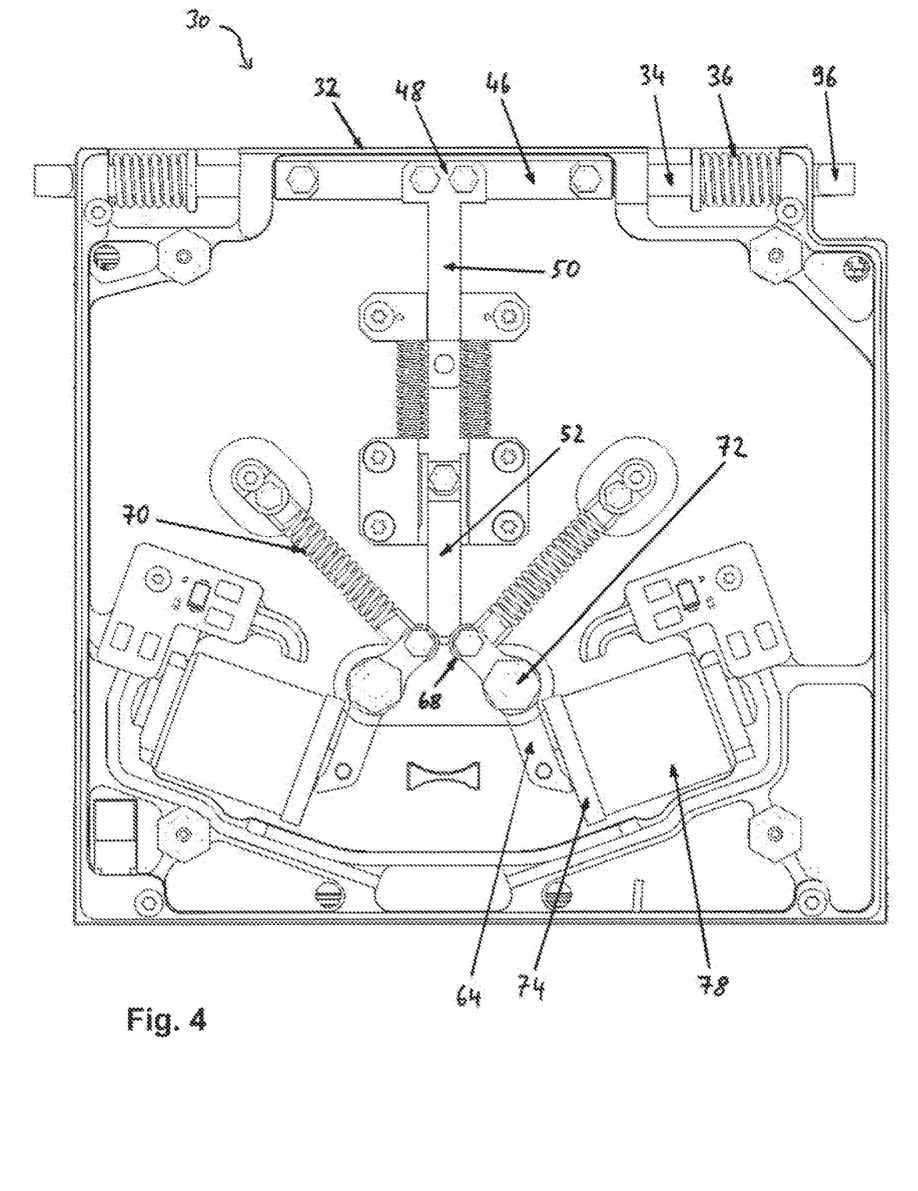
FIG. 4 shows a further plan view of the cover, with the release mechanism being located in a blocking position.

One and the same cover 30 is respectively shown in FIGS. 2 and 4 without a covering 102 visible in FIG. 1 such that a release mechanism of the cover 30 is visible. In FIG. 2, the release mechanism is in a release position in which the cover 30 can move into its open position. FIG. 4 shows the release mechanism in a blocking position in which the cover 30 is blocked in its closed position.

The cover 30 comprises two bolts 34 that project, as visible in FIG. 4, from a cover frame 32 of the cover 30 in opposite directions for blocking the cover 30 and that engage with the frame 22. Each bolt 34 is preloaded by a bolt spring 36 via a securing ring 38 and a disk 40 into a release position, namely in the direction of a cover interior. The bolt spring 36 is supported at the cover frame 32 for this purpose.

Each bolt 34 has a bolt head 42 that is disposed opposite a blocking bolt end and forms a rotary joint with a limb 46 via a pivot pin 44. The limb 46 is likewise connected to an elbow element 48 of a slider 50 rotatable about a pivot pin 47. The limb 46 and the elbow element 48 form an elbow joint for the respective bolt 34.

The slider 50 is displaceably supported by a first slider bearing 58 and by a second slider bearing 60 in a direction perpendicular to the bolt 34, vertically in FIG. 2. The slider bearings 58, 60 are fixed to the cover frame 32 via screws 62. The slider 50 is preloaded by two slider springs 54 in the direction of a release position. The slider springs 54 are each guided on a spring guiding pin 56.

The slider 50 comprises a pivot arm 52 that is rotatably connected to a body of the slider 50 via a pivot pin 51. The pivot arm 52 comprises at an end disposed opposite the pivot pin 51 two slopes 53 at which the pivot arm 52 and thus the slider 50 are supported in a blocking position.

The release mechanism additionally comprises two rocker levers 64 that are each rotatably supported by lever bearing pin 72. Each lever 64 has a first lever arm at whose end a ball bearing 68 is provided for engagement with one of the slopes 53 of the pivot arm 52 in the blocking position. The ball bearing 68 is connected to the first lever arm via a pin 66. A lever spring 70 is additionally active at the first lever arm and preloads the rocker lever 64 into a release position. A second lever arm of the rocker lever 64 disposed opposite the first lever arm comprises a rotational pin 76 via which a magnetic plate 74 is rotatably connected to the second lever arm of the rocker lever 64. The magnetic plate 74 does not necessarily have its own permanent magnetic field, but can rather be magnetically acted on by a force.

An electric permanent magnet 78 that is fixed to the cover frame 32 via a screw 82 is provided to attract the magnetic plate 74 and thus to hold the rocker lever 64 against a preload force of the lever spring 70 into the blocking position. The electric permanent magnet 78 has a permanent magnetic field that is electrically variable to release the cover 30. A circuit board 84 that is likewise fixed to the cover frame 32 by a screw 86 is provided to vary the magnetic field. A cable conduit 88 from the circuit board 84 to a control unit, not shown, is indicated by an arrow.

The function of the release mechanism of the cover 30 will be described in more detail in the following. FIG. 4 shows the release mechanism in its blocking position and FIG. 2 shows the release mechanism in its release position.

When, starting from the blocking position in accordance with FIG. 4, a release command is output to the circuit boards 84 by the control device, a respective circuit board 84 generates an electrical impulse that briefly attenuates the permanent magnetic field of the associated electric permanent magnet 78 The permanent magnetic field is in this respect attenuated at least so much that the associated lever spring 70 moves the associated rocker lever 64 into its release position and in so doing releases the magnetic plate 74 from the electric permanent magnet 78.

The release command of the control device is simultaneously transmitted to both circuit boards 84. Both rocker levers 64 are therefore moved substantially simultaneously into the release position. The two lever arms are in engagement with an abutment 80 in the release position.

In the blocking position, both rocker levers 64 support the pivot arm 52 and thus the slider 50. If now the rocker levers 64 are moved into the release position, the pivot arm 52, and thus the slider 50, are no longer supported in this blocking position, but are rather released into the release position, namely vertically downwardly in FIGS. 2 and 4.

The associated lever springs 70 and the associated electric permanent magnets 78 of the rocker levers 64 are each arranged symmetrically with respect to a displacement axis of the slider 50. If one of the rocker levers 64 is not moved into its release position in response to the release command of the control device, for example because the associated circuit board 84 is defective, the slider 50 is nevertheless displaced into the release position. For in this case, the pivot arm 52 slides off at the ball bearing 68 of the rocker lever 64 that has remained in the blocking position and is pivoted with respect to the slider body so that the slider 50 can slide into its release position. The symmetrically arranged rocker levers 64 therefore in particular form a redundant mechanism in conjunction with the pivot arm 52 to release the slider 50 into its release position. This mechanism also ensures a release when one of the rocker levers 64 defectively remains in its blocking position.

In the blocking position of FIG. 4, the pivot arm 52 is supported at its end-side slopes 53 at the respective first lever arms of the rocker levers 64 such that forces exerted on the rocker levers 64 by the slider 50 or by the pivot arm 52 extend through a respective axis of rotation of the rocker levers 64 that is defined by the lever bearing pin 72. It is hereby ensured that these forces are completely received by the lever bearing pins 72 and do not result in a torque on the rocker lever 64 about the lever bearing pin 72. This ensures that the magnetic plate 74 also does not release from the electric permanent magnet 78 in an unwanted manner under high loads of the ejection unit 20.

In the blocking position, the elbow element 48 is positioned substantially exactly between the bolts 34 and the limbs 46 are in this respect aligned in parallel with the bolts 34. In this position, the spring forces of the bolt springs 36 act in opposite directions and balance in the elbow element 48. In the blocking position, the bolt springs 36 therefore substantially do not exert any force on the slider 50 in the direction of its displacement axis. This arrangement also minimizes forces exerted on the slider 50 under high loads, in particular during the transport of the satellite in a rocket. This arrangement also contributes to the fact that the release mechanism is not moved into the release position at an unwanted time and thus releases the cover in an unwanted manner.

As soon as at least one of the rocker levers 64 pivots into its release position, the slider 50 is therefore displaced, vertically downwardly in FIG. 4, by the slider spring 54 out of its blocking position in the direction of its release position. The slider spring 54 has relatively small dimensions, in particular in comparison with the bolt springs 36, and substantially only serves to deflect the elbow element 48 minimally so that the spring forces of the bolt springs 36 no longer mutually balance, but rather displace the slider 50 via the limbs 46 into the release position shown in FIG. 2. In this respect, the bolts 34 are displaced in the direction of the cover interior, that is they are moved into their release position.

Each bolt spring 36 in this respect has such large dimensions that its spring force is sufficient to displace the slider 50 into its release position on its own and simultaneously to pull the respective other bolt 34 via the linkage into its release position. If therefore the bolt spring 36a of the one bolt 34a fails because it has broken, for example, the slider 50 and the bolt 34a as well as the bolt 34b are nevertheless displaced into the release position by the bolt spring 36b of the other bolt 34b. It is therefore ensured that the cover 30 is also reliably released in the simple defect case, that is when one of the bolt springs 36 fails.

Figure 3:
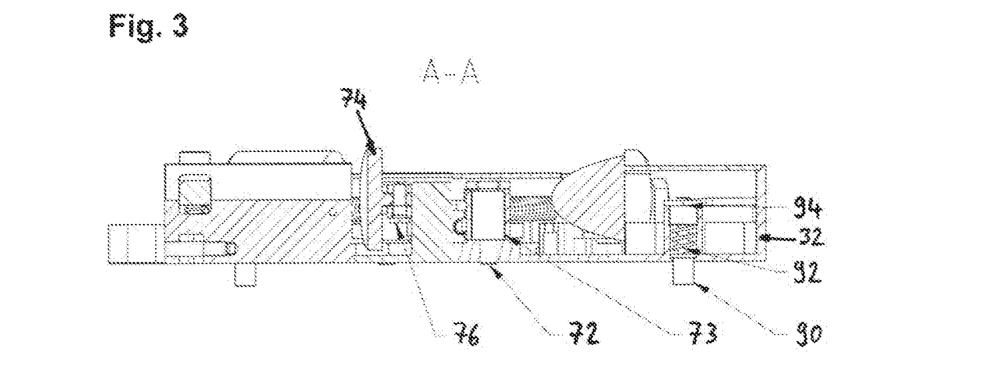
FIG. 3 shows a sectional view of the cover.

A sectional view of the cover along a line A-A indicated in FIG. 2 is shown in FIG. 3. A damping pin 90 provided for holding the satellite in the ejection direction is preloaded with respect to the satellite by a damping pin spring 92 in the closed position of the cover 30. The damping pin spring 92 is in this respect supported at a clamping screw 94 that is fixedly connected to the cover frame 32.

One of the lever bearing pins 72 is additionally visible in FIG. 3 and rotatably supports the corresponding rocker lever 64 via a lever bearing sleeve 73. Furthermore, one of the rotational pins 76 is visible that supports the associated magnetic plate 74 rotatably with respect to the corresponding rocker lever 64.

Figure 5:
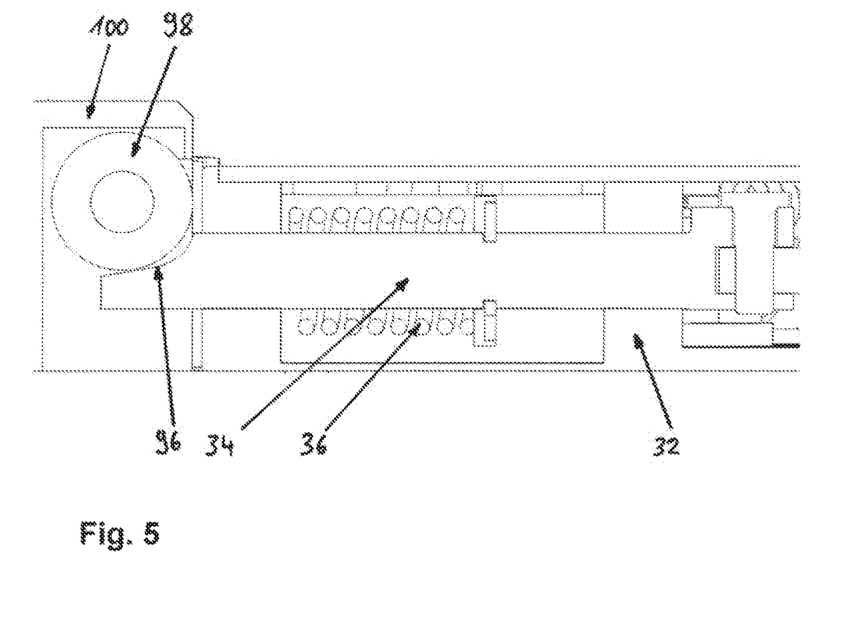
FIG. 5 shows a bolt of the cover in a sectional view.

FIG. 5 shows a sectional view of a corner region of the cover 30 in the blocking position. The bolt 34 in this respect projects laterally out of the cover frame 32 and is in engagement with a counter-bearing element 100 fastened to the frame 22 for blocking the cover 30 in the closed position. The bolt spring 36 in this respect preloads the bolt 34 into the release position. The bolt 34 has at its end projecting from the cover frame 32 a slope 96 that contacts a ball bearing 98 that is fastened to the counter-bearing element 100. The slope 96 has a swept contour. The bolt 34 can be drawn particularly smoothly into the interior of the cover 30, that is into its release position, due to the slope 96 and due to the ball bearing 98. In this respect, the slope 96 can slide off at an outer ring of the ball bearing 98 without the bolt 34 being blocked. In particular since the outer ring of the ball bearing 98 is rotatable with respect to the counter-bearing element 100, galling between the bolt 34 and the counter-bearing element 100 is also avoided at high loads. A reliable drawing in of the bolt 34 is therefore ensured with a particularly high reliability.

The damping pin springs 92 of which one is shown in FIG. 3 and the cover spring 26 are each per se and at least together of sufficiently large dimensions that the bolt 34 is preloaded in the closed position of the cover with the slope 96 so much against the ball bearing 98 that both bolts 34 are themselves displaced inwardly, that is into their release positions, via the respective slopes 96 if both bolt springs 36 fail. A further redundancy factor is hereby provided that ensures with a particularly high reliability that the bolts 34 are displaced into the release position at the desired time and release the cover 30 to eject the satellite.

Figure 6:
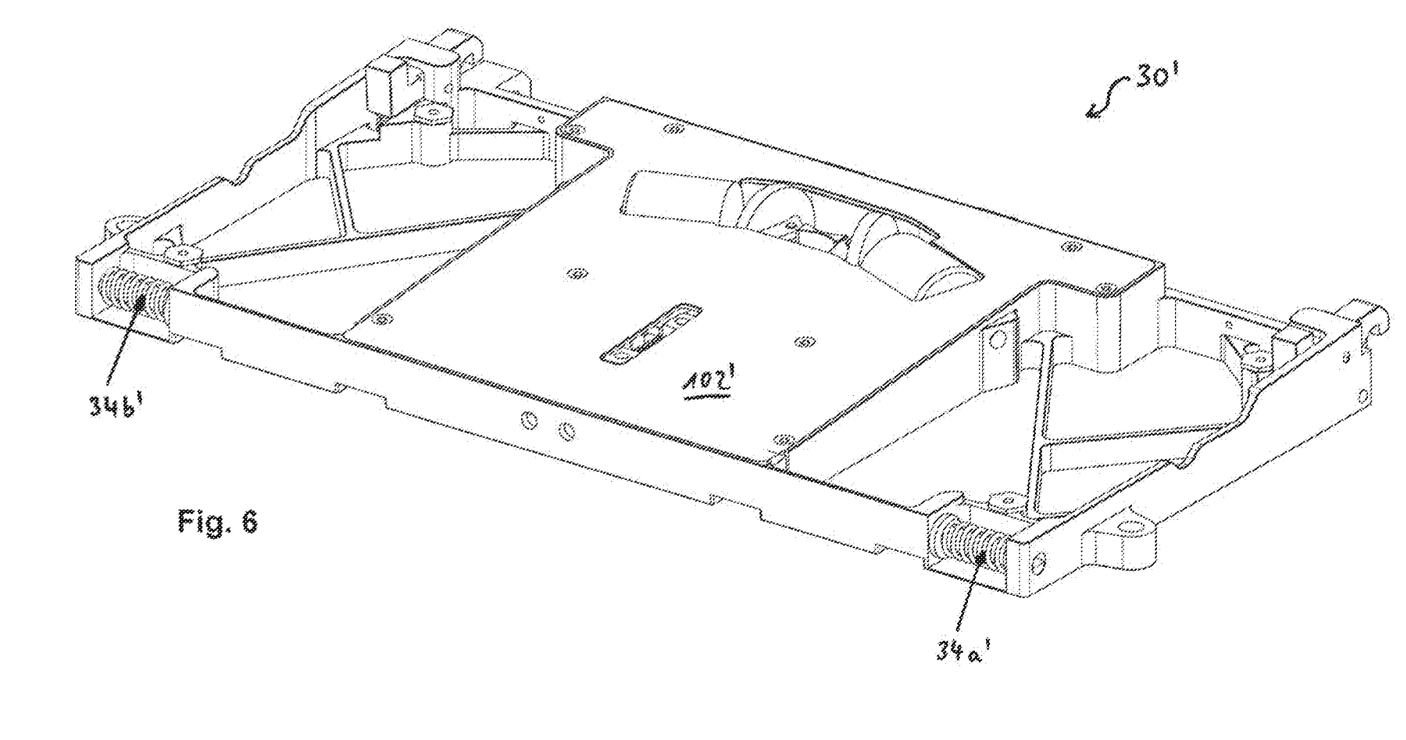
FIG. 6 shows an alternative embodiment of a cover of an ejection unit in accordance with the invention.

FIG. 6 shows an alternative embodiment of a cover 30' that covers two of the four satellite chambers in the ejection unit 20 of FIG. 1. Alternatively, for example, two of the adjacent satellite chambers can be connected to form a wider satellite chamber for a wider satellite and can be closed by the cover 30'. The cover 30' just like the cover 30 of FIGS. 1 to 5 has a release mechanism for moving two bolts 34a' and 34b' into a release position. The release mechanism is, however, covered by a cover covering 102' in FIG. 6. The cover 30' therefore substantially corresponds to the cover 30 of FIGS. 1 to 4, but is wider.

Figure 7:
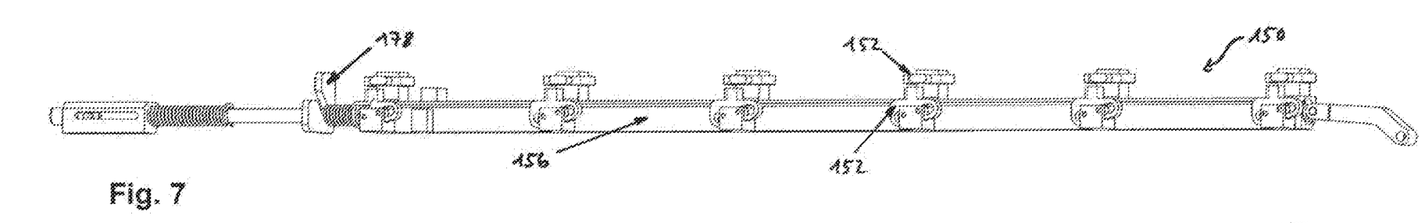
FIG. 7 shows a fixing apparatus of the ejection unit of FIG. 1 in a perspective view.
Figure 8:
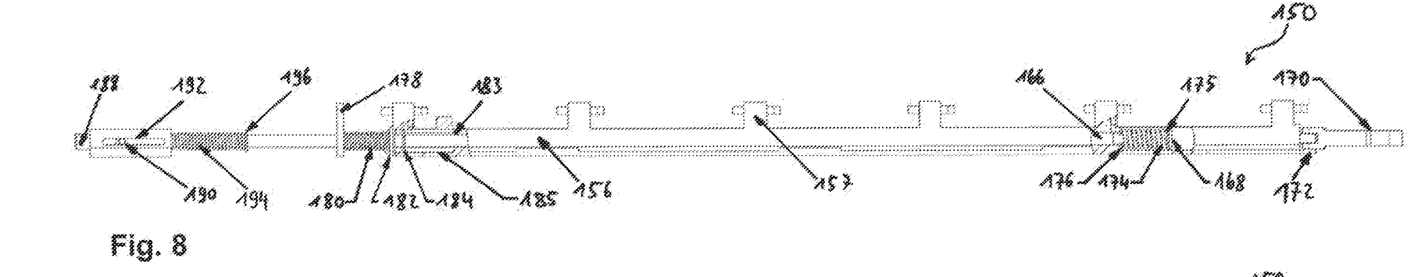
FIG. 8 shows the fixing apparatus in a side view.
Figure 9:
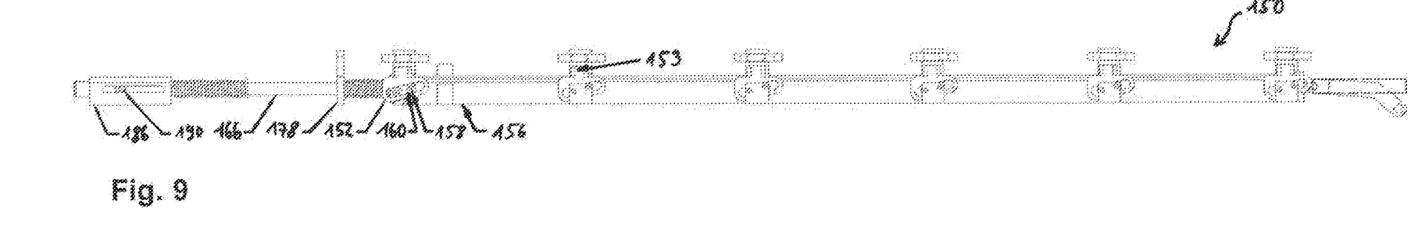
FIG. 9 shows the fixing apparatus in a further side view.

In FIGS. 7 to 9, the fixing apparatus 150 of the ejection unit 20 of FIG. 1 is shown in a perspective view and in side views respectively. The fixing apparatus 150 comprises a plurality of pairs of fixing elements 152 that each act in a common plane and that are each displaceable in a translatory manner transversely to the ejection direction A to fix or release the satellite. The fixing apparatus 150 additionally comprises a hollow section 156 and a control bar 166 that extends through the hollow section 156 and is displaceable relative thereto along the ejection direction A. The control bar 166 is coupled via a pivot pin 172 to a coupling member 170 rotatable about the pivot pin 172. The coupling member 170 is, as shown in FIG. 1, coupled at an end disposed opposite the pivot pin 172 to the associated cover 30 such that an opening of the cover 30 displaces the control bar 166 along the ejection direction A, to the right in FIGS. 7 to 9, in the direction of a release position. The control bar 166 is guided by a sleeve 168 in a cover-side end region.

A support element 178 is provided that is fixed to the frame 22 and displaceably guides the control bar 166. A spring 180 that preloads the hollow section 156 in the ejection direction A via a disk 182 is supported at the support element 178. In the closed position of the cover, a spring 174 additionally preloads the hollow section via a securing ring 175 with respect to the control bar 166 and against the ejection direction A. A disk 175 is arranged between the hollow section 156 and the spring 174 and is displaceably supported in a cut-out of the control bar 166, wherein the cut-out is long enough in the axial direction, that is along the ejection direction A, that the spring 174 can balance production tolerances, for example minimal size differences of satellites.

If the control bar 166 is now displaced through an opening of the cover in the ejection direction A, the spring 174 first relaxes and the disk 176 moves, after a short opening distance, into engagement with an abutment of the cut-out of the control bar 166 at the side of the ejection spring. The spring 180 thereupon displaces the hollow section 156 in the ejection direction A via the disk 182. The displacement of the hollow section 156 effects a movement of the fixing elements 152 out of a fixing position into a release position, which will be explained in more detail below, in particular with respect to FIG. 12.

A securing ring 184 is furthermore fastened to the control bar 166 and the hollow section 156 has a cut-out 185 corresponding to the securing ring 184 with an abutment 183 at the cover side. When the securing ring 184 comes into engagement with the abutment 183 on the displacement of the control bar 166 in the ejection direction A, the hollow section 156 is displaced with the control bar 166 in the ejection direction A. A redundant measure is thus realized by which the hollow section 156 is also displaced into the release position when the spring 180 fails. The satellite is therefore released at the desired ejection site with a particularly high reliability.

A latch 186 that is supported in a floating manner with respect to the control bar 166 is provided at an end of the control bar 166 at the ejection spring side. The latch 186 is preloaded with respect to the control bar 166 against the ejection direction A by a spring 194, wherein the spring 194 is supported at a securing ring 196 of the control bar 166. The latch 186 is displaceably guided with respect to the control bar 166. The control bar 166 has a guide pin 190 that is guided in a linear guide 192 of the latch 186. As soon as the guide pin 190 abuts an end of the guide 192 at the cover side, the latch 186 is displaced together with the control bar 166 in the ejection direction A and a latch pin 188 is moved into a release position. This process will be described in more detail below with reference to FIG. 13.

The latch 186 and the coupling member 170 can be attached to the control bar 166 in different orientations. Depending on the installation position of the fixing apparatus 150 in the ejection unit 20, the latch 186 in accordance with FIG. 8 or in accordance with FIG. 9 can therefore, for example, be fastened to the control bar 166. Different possible orientations of the coupling member 170 are indicated in FIG. 9.

Figure 10:
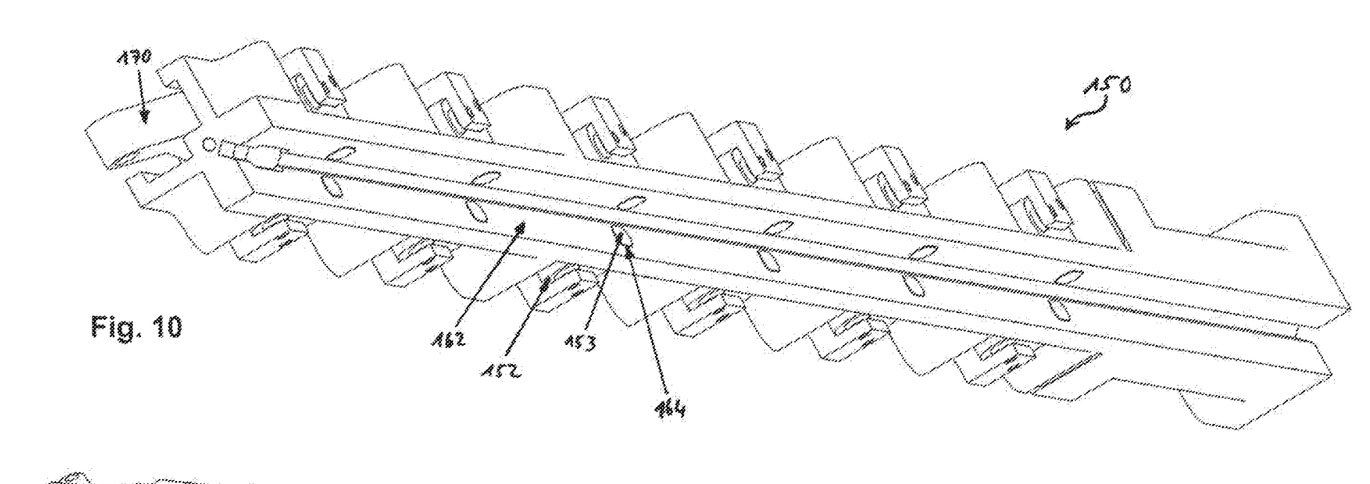
FIG. 10 shows the fixing apparatus and a rail for a satellite in a perspective view.
Figure 11:
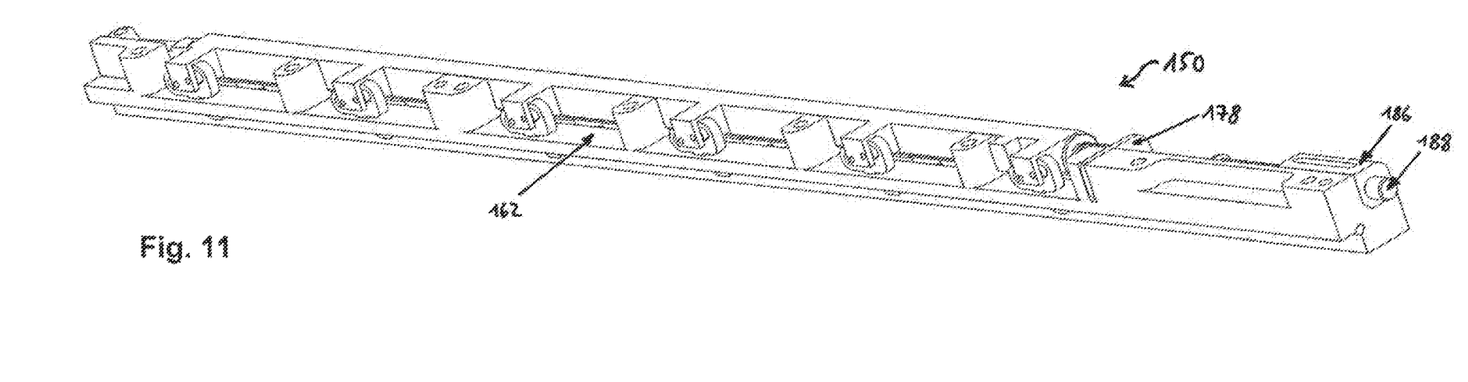
FIG. 11 shows the fixing apparatus and the rail in a further perspective view.

In FIGS. 10 and 11, the fixing apparatus 150 is shown together with a rail 162 for the satellite in different perspective views. The rail 162 has a plurality of transverse guides 164 in each case for a fixing projection 153 of a fixing element 152. It can also be seen in FIG. 11 that the rail 162 forms a guide in the ejection apparatus for the latch 186. The coupling member 170, the support element 178 and the latch 168 with the latch pin 188 are furthermore in particular visible in FIGS. 10 and 11.

Figure 12:
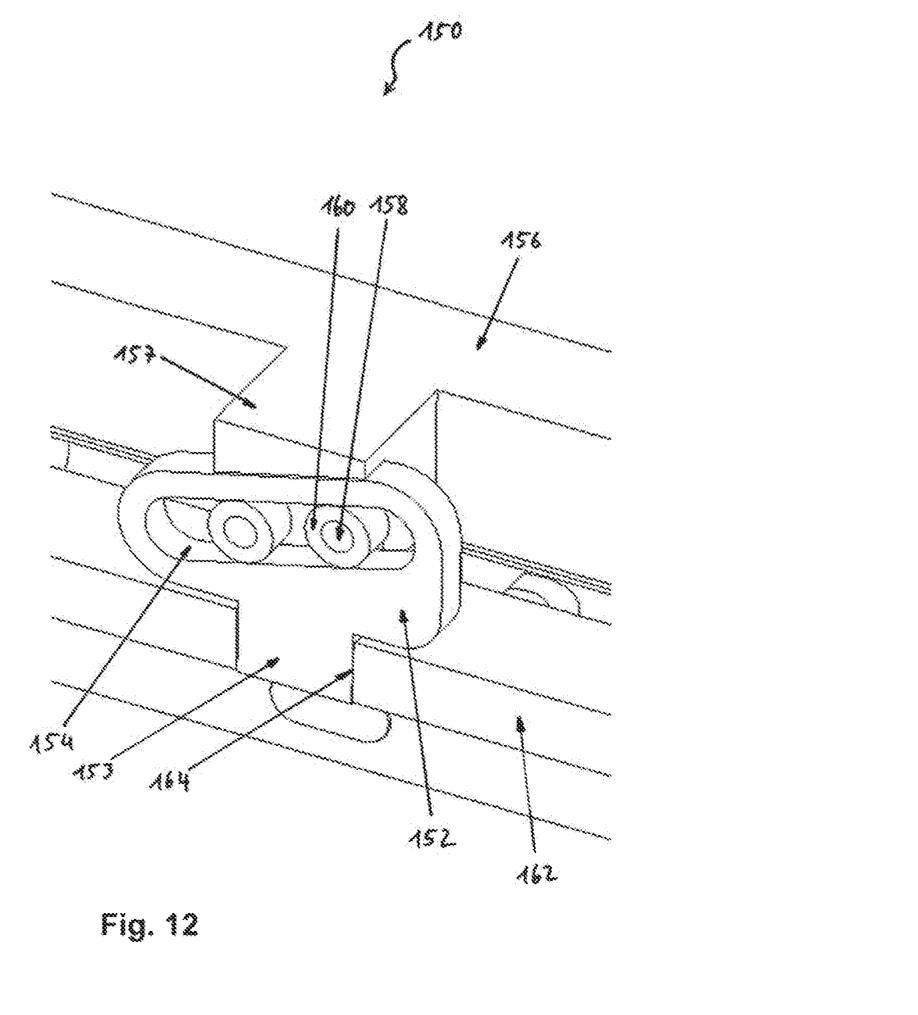
FIG. 12 shows a fixing element of the fixing apparatus in a perspective sectional view.

FIG. 12 shows one of the fixing elements 152 in detail in a sectional view. The fixing element 152 comprises a slot guide 154 that is in engagement with two guide rollers 160 that are carried by respective guide pins 158. The guide pins 158 are fastened to a projection 157 of the hollow section 156. The fixing element 152 additionally comprises a fixing projection 153 for acting on the satellite, wherein the fixing projection 153 is guided in a transverse guide 164 of the rail 162 transversely to the ejection direction A.

The slot guide 154 is formed as an elongate hole that extends obliquely with respect to the ejection direction A. When the hollow section 156 is displaced relative to the rail 162, to the right in FIG. 12, the guide pins 158 and the guide roller 160 cooperate with the slot guide 154 such that the fixing element 152 is displaced along the transverse guide 164 with respect to the satellite, that is downwardly in FIG. 12. If, in contrast, the hollow section 156 is displaced in the ejection direction A, that is to the left in FIG. 12, the fixing element 152 is moved into a release position, that is, is displaced upwardly in FIG. 12.

Figure 13:
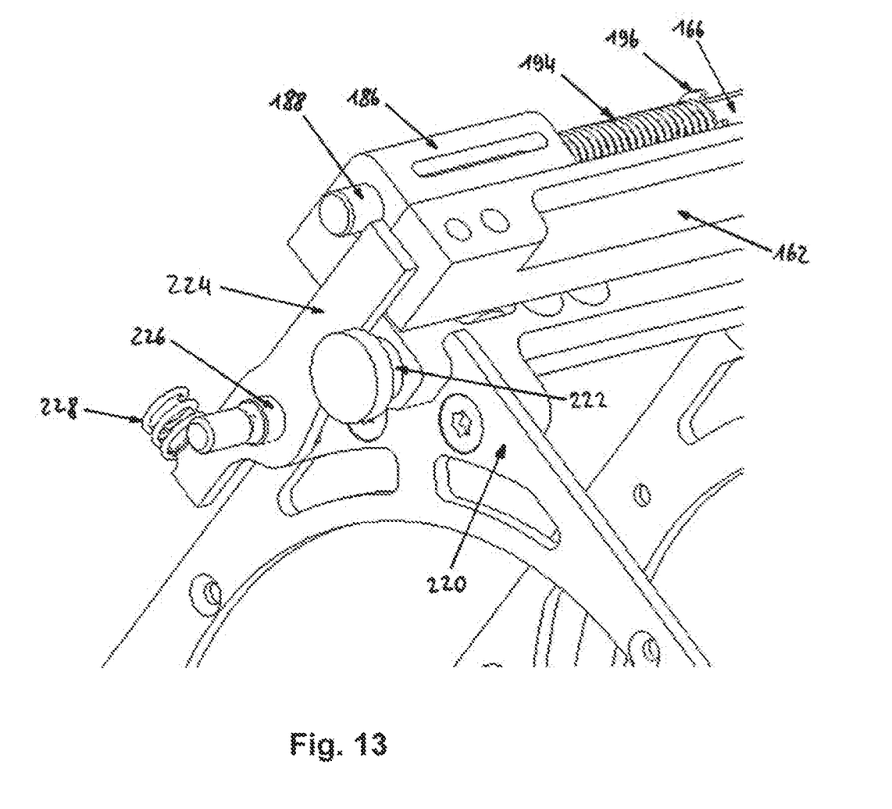
FIG. 13 shows a securing mechanism for a satellite platform of the ejection unit of FIG. 1 in a perspective view.

A satellite platform 220 is shown in FIG. 13 that is preloaded in the ejection direction A by an ejection spring, not shown. The satellite platform 220 is secured by a lever 224 that engages into a securing cut-out 222. The lever 224 is rotatably supported by a pivot bearing 226 and is preloaded by a spring 228 into a released position with respect to the pivot bearing 226 with regard to the securing cut-out 222. The latch pin 188 holds the lever 224 in a secured position, that is in engagement with the securing cut-out 222, against the spring force of said spring 228.

When the latch 186 is displaced in the ejection direction A, the latch pin 188 moves out of engagement with the lever 224 and releases it into the released position such that the ejection spring can displace the satellite platform 220 in the ejection direction A and thus ejects the satellite. If the lever 224 is in the released position, a movement of the latch 186 against the ejection direction A, that is to the left in FIG. 13, can produce a collision of the latch pin 188 with the lever 224. This can, for example, be caused by an accidental closing of the cover 30 during an assembly or handling of the ejection unit 20. Since the latch 186 is supported in a floating manner with respect to the control bar 166, the latch 186 can simply be cushioned toward the spring 194 and the securing ring 196 in the case of a collision and damage, in particular to the lever 224, is avoided.

The ejection unit 20 of FIG. 1 is configured such that the fixing elements 152 are moved into their release position, that is release the satellite, at an opening angle of the associated cover 30 of approximately 90°. At an opening angle of approximately 105°, the latch 186 is moved into its release position and thus releases the ejection spring for ejecting the satellite. This temporal sequence is in particular implemented by the above-described mechanisms.

The ejection unit 20 can receive a satellite of the size 3 U in accordance with the CubeSat standard in the configuration shown, for example in one of the four satellite chambers. Alternatively, for example, a satellite of the size 1 U and one of the size 2 U can also be received together, for example, in a satellite chamber. It is also possible to place adjacent chambers together, that is, for example, to remove provided partition walls between the chambers in order, for example, to provide a chamber for a satellite of the size 6 U. Such a chamber can in particular be closed by a cover 30' in accordance with FIG. 6.

Figure 14:
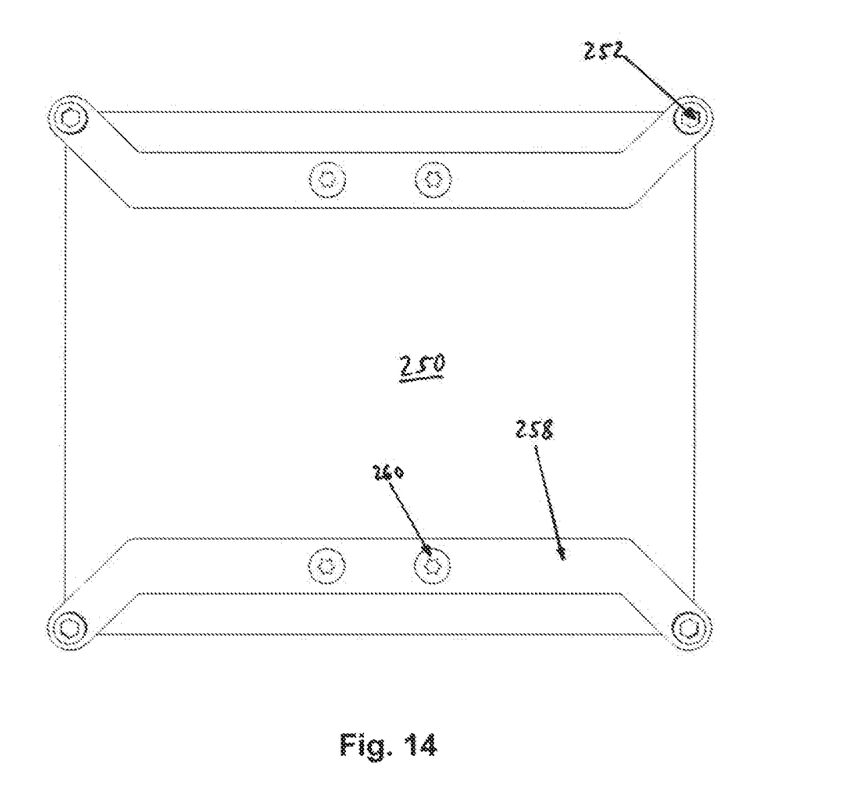
FIG. 14 shows a covering of the ejection unit of FIG. 1.
Figure 15:
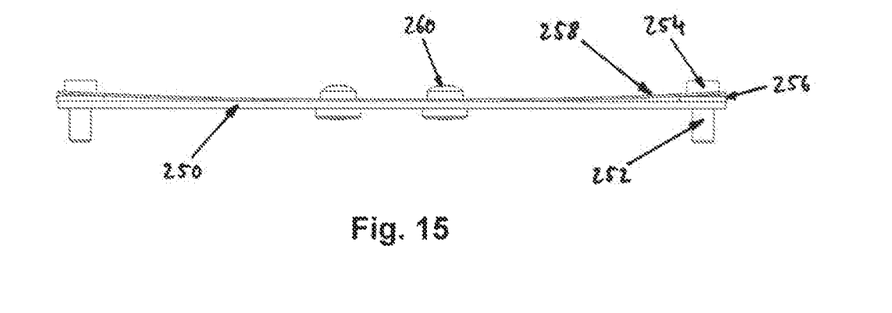
FIG. 15 shows a side view of the covering.

A covering 250 of the ejection unit 20 of FIG. 1 is shown in a plan view and a side view respectively in FIGS. 14 and 15. The covering is fastened to the frame 22 of the ejection unit 20 by screws 252 to cover an opening of the frame. A respective screw 252 has a screw head having a cylindrical section 254 and a peripheral projection 256. An elastic lug 258 engages about the cylindrical section 254 with a corresponding cut-out and preloads the screw 252 via the peripheral projection 256 in a fastening direction, downwardly in FIG. 15. The lug 258 is fastened to the covering 250 by screws 260. The screw 252 has an internal drive, in this embodiment a hexagon socket.

To release the covering 250 from the frame 22, the screws 252 can be unscrewed, wherein they remain preloaded in the fastening direction by the lug 258. The respective screw 252 is also hereby held at the covering 250 in the released state such that the screw 252 is not lost.

REFERENCE NUMERAL LIST 20 ejection unit
22 frame
24 cover axis
26 cover spring
30, 30' cover
32 cover frame
34 a, b bolt
36 a, b bolt spring
38 securing ring
40 disk
42 bolt head
44 joint pin
46 limb
47 joint pin
48 elbow element
50 slider
51 joint pin
52 pivot arm
53 slope
54 slider spring
56 spring guiding pin
58 first slider bearing
60 second slider bearing
62 spring
64 a, b rocker lever
66 pin
68 ball bearing
70 lever spring
72 lever bearing pin
73 lever bearing sleeve
74 magnetic plate
76 rotational pin
78 magnet
80 abutment
82 spring
84 a, b circuit board
86 screw
88 cable conduit
90 damping pin
92 damping pin spring
94 clamping screw
96 slope
98 ball bearing
100 ball bearing element
102 cover covering
150 fixing apparatus
152 fixing element 153 fixing projection
154 slot guide
156 hollow section
157 projection
158 guide pin
160 guide roller
162 rail
164 transverse guide
166 control bar
168 sleeve
170 coupling member
172 joint pin
174 spring
175 securing ring
176 disk
178 support element
180 spring
182 disk
183 abutment
184 securing ring
185 cut-out
186 latch
188 latch pin
190 guide pin
192 guide
194 spring
196 securing ring
220 satellite platform
222 securing cut-out
224 lever
226 pivot bearing
228 spring
250 covering
252 screw
254 cylindrical section
256 projection
258 lug
260 screw
A ejection direction

The invention claimed is:

1. An ejection unit for at least one satellite, the ejection unit comprising
a frame that defines an inner space for receiving the satellite; and a retention device for holding the satellite in the inner space, the retention device being configured such that the satellite is releasable by the retention device;
wherein the retention device comprises a cover for closing the inner space, with the cover being blocked in a closed position by at least one shiftable bolt in a releasable manner with respect to the frame;
wherein two bolts are provided;
wherein each bolt is connected via a separate linkage to a slider of the release mechanism and the linkages form a double elbow joint with the slider, the double elbow joint coupling the bolts to the slider such that a movement of a bolt into the release position results in a movement of the other bolt into the release position.

2. An ejection unit for at least one satellite, the ejection unit comprising
a frame that defines an inner space for receiving the satellite; and a retention device for holding the satellite in the inner space, the retention device being configured such that the satellite is releasable by the retention device;
wherein the retention device comprises a cover for closing the inner space, with the cover being blocked in a closed position by at least one shiftable bolt in a releasable manner with respect to the frame;
wherein the release mechanism comprises at least one rocker lever by which the at least one bolt is held in a blocking position;
wherein two rocker levers are provided and a preloaded element of the release mechanism comprises a pivot arm that is in the blocking position in engagement with both rocker levers for supporting the preloaded element, with the pivot arm being pivotable such that the preloaded element can be released out of the blocking position by tilting only one rocker lever into a release position.

3. An ejection unit for at least one satellite, the ejection unit comprising
a frame that defines an inner space for receiving the satellite; and a retention device for holding the satellite in the inner space, the retention device being configured such that the satellite is releasable by the retention device;
wherein the retention device comprises a cover for closing the inner space, with the cover being blocked in a closed position by at least one shiftable bolt in a releasable manner with respect to the frame;
wherein the release mechanism comprises at least one rocker lever by which the at least one bolt is held in a blocking position;
wherein the at least one rocker lever has a pivot bearing and is loaded by a pretensioned element of the release mechanism that has a slope by which a force exerted on the rocker lever by the pretensioned element extends in the direction of the pivot bearing.

4. An ejection unit for at least one satellite, the ejection unit comprising
a frame that defines an inner space for receiving the satellite; and a retention device for holding the satellite in the inner space, the retention device being configured such that the satellite is releasable by the retention device;
wherein the retention device comprises a cover for closing the inner space, with the cover being blocked in a closed position by at least one shiftable bolt in a releasable manner with respect to the frame;
wherein the bolt has a slope for running onto frame side a counter-bearing for the bolt in the blocking position.

5. The ejection unit in accordance with claim 4, wherein the counter-bearing is a ball bearing.

6. The ejection unit in accordance with claim 4, wherein in a blocking position the bolt and the counter-bearing are pretensioned against each other in an ejection direction.

7. An ejection unit for at least one satellite, the ejection unit comprising
a frame that defines an inner space for receiving the satellite; and a retention device for holding the satellite in the inner space, the retention device being configured such that the satellite is releasable by the retention device;
wherein the retention device comprises a cover for closing the inner space, with the cover being blocked in a closed position by at least one shiftable bolt in a releasable manner with respect to the frame;
wherein two bolts and two rocker levers of the release mechanism are arranged symmetrically with respect to a slider of the release mechanism.

8. An ejection unit for at least one satellite, the ejection unit comprising a frame that defines an inner space for receiving the satellite; and a retention device for holding the satellite in the inner space, the retention device being configured such that the satellite is releasable by the retention device;

wherein the ejection unit defines an ejection direction and the retention device comprises a fixing apparatus that engages at the satellite for fixing the satellite transversely to the ejection direction, wherein the fixing apparatus has at least one movable fixing element that is movable in a translatory manner between a fixing position and a release position;

wherein the fixing element is displaceably supported in a rail for the satellite and/or for a satellite platform.

9. An ejection unit for at least one satellite, the ejection unit comprising a frame that defines an inner space for receiving the satellite; and a retention device for holding the satellite in the inner space, the retention device being configured such that the satellite is releasable by the retention device;

wherein the ejection unit defines an ejection direction and the retention device comprises a fixing apparatus that engages at the satellite for fixing the satellite transversely to the ejection direction, wherein the fixing apparatus has at least one movable fixing element that is movable in a translatory manner between a fixing position and a release position;

wherein the fixing apparatus comprises at least two elements that are displaceable relative to one another along the ejection direction for fixing and/or releasing the satellite;

wherein one of the elements is configured as a hollow section and a control bar is provided for controlling the displacement of the element relative to the other element, the control bar extending through the hollow section.

10. An ejection unit for at least one satellite, the ejection unit comprising a frame that defines an inner space for receiving the satellite; and a retention device for holding the satellite in the inner space, the retention device being configured such that the satellite is releasable by the retention device;

further comprising an ejection spring blockable by means of a lever and a latch for locking the lever in a blocking position, with the latch being coupled to a cover of the ejection unit supported in a floating manner.

11. The ejection unit in accordance with claim 10, wherein the latch is coupled to the cover via a spring.

* * * * *

UNITED STATES PATENT AND TRADEMARK OFFICE
CERTIFICATE OF CORRECTION

Page 1 of 1

PATENT NO. : 10,569,910 B2
APPLICATION NO. : 15/590425
DATED : February 25, 2020
INVENTOR(S) : Dimitriy Bogdanov et al.

It is certified that error appears in the above-identified patent and that said Letters Patent is hereby corrected as shown below:

On the Title Page

Please correct item (73) Assignee to read "EXOLAUNCH GmbH" instead of "EXOLAUNCH Gmbh".

Signed and Sealed this
Thirtieth Day of June, 2020

Andrei Iancu
*Director of the United States Patent and Trademark Office*